United States Patent [19]

Haartsen

[11] Patent Number: 5,794,157
[45] Date of Patent: Aug. 11, 1998

[54] METHOD AND SYSTEM FOR AUTONOMOUSLY ALLOCATING TRANSMIT POWER LEVELS FOR COMMUNICATION BETWEEN A CELLULAR TERMINAL AND A TELEPHONE BASE STATION

[75] Inventor: Jacobus C. Haartsen, Hambovägen, Sweden

[73] Assignee: Telefonaktiebolaget LM Ericsson, Stockholm, Sweden

[21] Appl. No.: 704,847

[22] Filed: Aug. 28, 1996

[51] Int. Cl.$^6$ .................................................. H04Q 7/00
[52] U.S. Cl. .......................... 455/522; 455/63; 455/422; 455/426
[58] Field of Search .......................... 455/63, 62, 513, 455/449, 446, 447, 448, 450, 451, 452, 454, 444, 432, 433, 464, 38.3, 509, 511, 512, 515, 522, 422, 426, 462, 554–555, 552, 574, 226.2, 127, 561; H04Q 7/00

[56] References Cited

U.S. PATENT DOCUMENTS

| 5,109,528 | 4/1992 | Uddenfeldt | 455/33.2 |
|---|---|---|---|
| 5,353,332 | 10/1994 | Raith et al. | 455/444 |
| 5,396,649 | 3/1995 | Hamabe | 455/513 |
| 5,428,668 | 6/1995 | Dent et al. | 379/59 |
| 5,448,619 | 9/1995 | Evans et al. | 455/426 |
| 5,507,034 | 4/1996 | Bodin et al. | 455/513 |
| 5,526,402 | 6/1996 | Dent et al. | 379/59 |
| 5,535,259 | 7/1996 | Dent et al. | 379/59 |
| 5,551,057 | 8/1996 | Mitra | 455/422 |
| 5,655,002 | 8/1997 | Proctor et al. | 455/450 |

Primary Examiner—Amelia Au
Assistant Examiner—Vu Le
Attorney, Agent, or Firm—Jenkens & Gilchrist

[57] ABSTRACT

A private radio system within a serving cell of a cellular communications system periodically monitors the broadcast information transmitted on the control channels of the serving and surrounding cells. From this monitoring, all those carrier frequencies serving as control channels are derived for the cell areas around the serving cell and a control channel list constructed. The private radio system then carries out signal strength measurements on the downlink control channels, and orders the control channel list accordingly. Alternatively, a mobile station that is attached to a private radio system can perform the downlink measurements and forward the measurements to the private radio system. In either event, the private radio system selects a communication channel from the ordered list and derives, from the received signal strength values of the control channels, the transmit power level required to both overcome interference caused by more distant cellular base stations and, at the same time, not interfere with those stations.

21 Claims, 3 Drawing Sheets

FIG.3

BCCH RSSI list (40):

| ARFCN | RXLEV |
|---|---|
| f_A1 | -60dBm |
| f_A2 | -80 |
| f_A3 | -86 |
| f_B1 | -110 |
| f_B2 | -94 |
| f_B3 | -94 |
| f_C1 | -112 |
| f_C2 | -95 |
| f_C3 | -97 |

ORDER → ordered list (42):

| ARFCN | RXLEV |
|---|---|
| f_A1 | -60dBm |
| f_A2 | -80 |
| f_A3 | -86 |
| f_B2 | -94 |
| f_B3 | -94 |
| f_C2 | -95 |
| f_C3 | -97 |
| f_B1 | -110 |
| f_C1 | -112 |

(44):

| ARFCN | RXLEV |
|---|---|
| f_B1 | -110 |
| f_C1 | -112 |

| ARFCN | RXLEV |
|---|---|
| f_A1 | -88dBm |
| f_A2 | -108 |
| f_A3 | -114 |
| f_B1 | -138 |
| f_B2 | -122 |
| f_B3 | -122 |
| f_C1 | -140 |
| f_C2 | -123 |
| f_C3 | -125 |

ORDER →

(42):

| ARFCN | RXLEV |
|---|---|
| f_A1 | -88dBm |
| f_A2 | -108 |
| f_A3 | -114 |
| f_B2 | -122 |
| f_B3 | -122 |
| f_C2 | -123 |
| f_C3 | -125 |
| f_B1 | -138 |
| f_C1 | -140 |

(44):

| ARFCN | RXLEV |
|---|---|
| f_B1 | -138 |
| f_C1 | -140 |

METHOD AND SYSTEM FOR AUTONOMOUSLY ALLOCATING TRANSMIT POWER LEVELS FOR COMMUNICATION BETWEEN A CELLULAR TERMINAL AND A TELEPHONE BASE STATION

FIELD OF THE INVENTION

The present invention relates generally to private radio communication systems, which typically cover local indoor residential or business areas. Particularly, the present invention relates to radio communication systems which employ an air-interface compatible to an existing cellular digital Time Division Multiple Access (TDMA) standard like the Global System for Mobile Communication (GSM) or the Digital Advanced Mobile Telephone Service (D-AMPS). More particularly, the present invention relates to automatic transmit power level allocation in such private radio systems providing levels that are low enough not to disturb the cellular system but are at the same time large enough to overcome the interference from the cellular system, and methods and communication systems for effectuating the same.

BACKGROUND OF THE INVENTION

The past decades have seen a considerable rise in the deployment of mobile telephony. After the slow start of analog standards like AMPS, Nordic Mobile Telephone (NMT) and the Total Access Communication System (TAS), mobile telephony has become recently quite popular in the consumer markets with products employing advanced digital standards like GSM and D-AMPS. In addition to other developments in mobile phone features, like smaller size and longer battery life, much progress has been made at the network side as well, particularly, in frequency reuse schemes to avoid co-channel interference between adjacent cells. Increasingly, dense cell reuse plans have been complemented with hierarchical cell structures, where macrocells cover entire districts, microcells cover smaller parts like streets, and picocells cover very small areas the size of a few rooms.

Although with the more dense base station planning the average distance between the base station and the mobile stations decreases, along with propagation loss, the requisite transmit powers have not decreased proportionally. This is primarily because better indoor coverage is required, which can only be guaranteed by relatively high transmit power levels, even if the overall distances between base stations and mobile stations decrease.

Recently, private networks for residential and business areas have been developed, which although using the same air-interface and the same spectrum as the cellular system, are not integrated with the overlaying public cellular network. In this sense, these private systems cannot be considered as micro or pico networks since there is no direct connection between these private systems and the cellular system. For example, for residential usage, private base stations can be used, such as described in U.S. Pat. Nos. 5,428,668 and 5,526,402, which only connect to the Public Switching Telephone Network (PSTN).

If, however, such a private radio communication system is placed into an area covered by the cellular system with which the private system has to share frequencies, a problem arises since the private base stations are not coordinated with the cellular network. In a related patent application by the inventor herein, entitled "Method and System for Autonomously Allocating a Cellular Communications Channel for Communication between a Cellular Terminal and a Telephone Base Station," filed concurrently herewith and incorporated herein by reference, a method and communications system are disclosed which allow a private radio system to autonomously determine those frequencies it can use with minimal disturbance to and from the overlaying cellular system. This is accomplished by having the private radio system analyze the uplink and downlink received signal strength measurements. The aforementioned related patent application, however, does not address the separate albeit related problem addressed in the present application, i.e., how the transmit power levels on those private radio systems should be chosen.

In a sparsely populated communications area with cellular base stations widely spaced apart, private radio systems within an overlaying cellular system can use low transmit power levels since the interfering cellular base station will generally be far away. However, in a more dense signal environment, a cellular base station reusing the same frequencies may be considerably closer and can, therefore, produce much interference with the private radio systems therein. This interference can only be overcome by the private base station using greater transmitter (TX) power. However, since the private base station is not coordinated with the cellular system, it is a non-trivial problem for the private radio system to determine what TX power to use in its particular environment so as not to cause interference itself. Furthermore, the requisite TX power levels may change over time when cellular base stations are added or removed.

It is, accordingly, an object of the present invention to provide a method, and an associated communications system, in which transmit power level allocation occurs in a private radio system autonomously.

It is a further object of the present invention that the method be adaptive, particularly, that the private radio system adapt autonomously and automatically to transmit power level and frequency changes within the overlapping cellular network.

It is a more particular object of the present invention that the method automatically determines a suitable transmit power level for a given private radio system within the cellular network which not only overcomes interference from the cellular network but is also not so strong as to cause interference itself.

SUMMARY OF THE INVENTION

The present invention advantageously provides an allocation method and communication system for autonomously allocating transmit power levels to a private radio system.

The private radio system periodically monitors the broadcast information transmitted on the control channels of the serving and surrounding cells of a cellular system or systems. From this monitoring, all those carrier frequencies serving as control channels are derived for the cell areas around the serving cell. The private radio system then carries out signal strength measurements on the downlink control channels. Alternatively, a mobile station attached to a private radio system can perform the downlink measurements and forward the measurements to the private radio system. In either event, the private radio system derives, from the received signal strength values of the control channels, what transmit power level to a respective private radio system is required to overcome interference caused by more distant cellular base stations.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 3 illustrates the ordering of the control channel list and the selection of the candidate control channel list prepared in accordance with the present invention using a short inter-base station distance of the cellular system; and FIG. 4 illustrates the ordering of the control channel list and the selection of the candidate control list as in FIG. 3 using a longer inter-base station distance of the cellular system.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
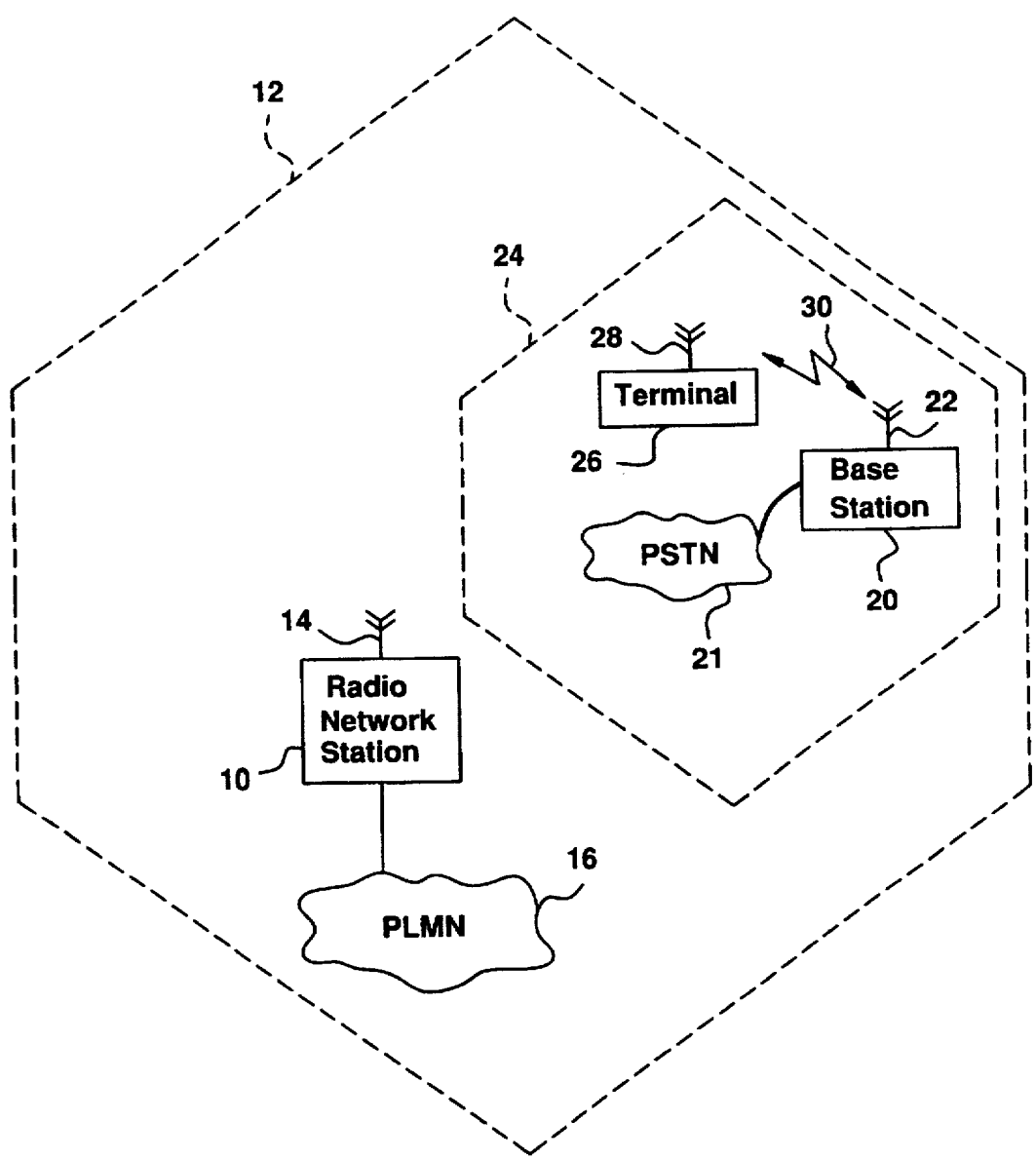
FIG. 1 is a schematic illustration of a radio personal communication system within a cell of a cellular network, the private radio system including a base station and a cellular terminal, with radio communications between the terminal and the base station.
Figure 2:
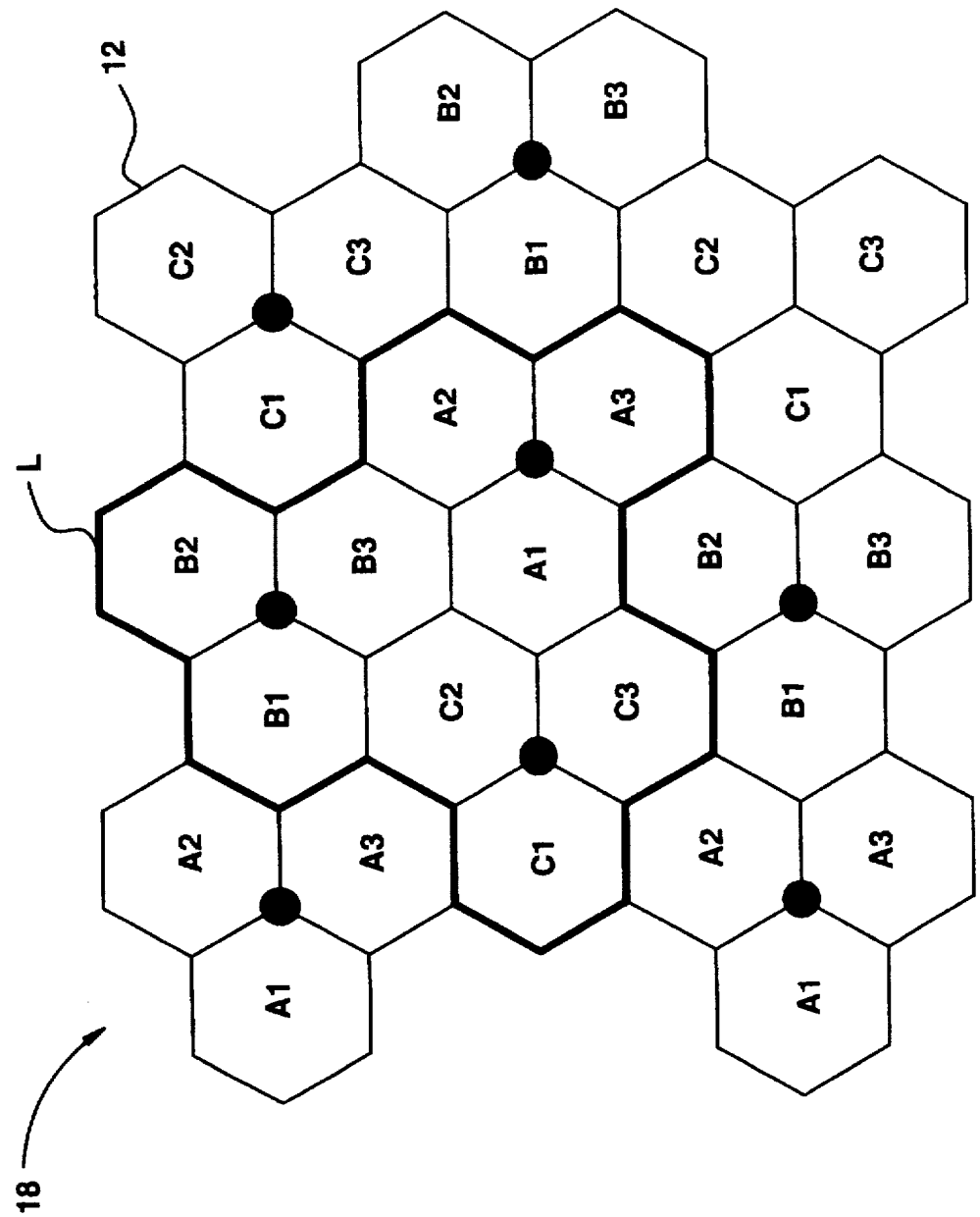
FIG. 2 is a schematic illustration of a 3/9 reuse pattern of a wide area cellular network.

Referring now to FIG. 1, a conceptual diagram of a radio personal communications system according to the present invention is shown. Such a system operates within a cellular communications network which allocates portions of a plurality of frequencies within a spectrum to separate geographic cells. Thus, the network encompasses a wide area wireless communications network having the capacity to provide high quality wireless communications to a large number of users with a limited number of frequencies allocated to the wide area cellular network. As shown in FIG. 1, a wide area cellular network includes at least one radio network cell station 10, such as a cellular telephone cell station, for transmitting and receiving messages in a network cell range indicated by 12, via cell antenna 14. The range 12 of radio network cell station 10 is typically represented graphically as a hexagon, as illustrated in FIGS. 1 and 2. Radio network cell station 10 also interfaces with a Public Land Mobile Network (PLMN) 16.

It will be understood by those having skill in the art that a wide area cellular network 18 typically includes many radio network cell stations 10 to cover a large area as illustrated in FIG. 2. In such a system, each radio network cell station 10 covers a cell (range) 12 within the wide area cellular network 18 and may interface with Base Station Controllers (BSCs, not shown) and Mobile Switching Centers (MSCs, not shown). The MSC may provide the connection to the PLMN 16 for all of the network cell stations 10 that make up the wide area cellular network 18.

With further reference to FIG. 1, one or more private or personal telephone base stations 20 are located within the cell (range) 12 of the network cell station 10 of the wide area cellular system or network 18. Base station 20 includes a low power transceiver for transmitting and receiving signals via base station antenna 22, over a limited base station range 24, typically on the order of tens of meters. Thus, a base station 20 may be used for transmission and receipt of radio personal communications in a home or office. Base station 20 is electrically connected to a wire network 21, such as the Public Switched Telephone Network (PSTN). PSTN 21 is the regular "wire line" telephone system supplied by, for example, the regional Bell Operating Companies, and may use copper wire, optical fiber or other stationary transmission channels. Base station 20 may be wired directly to the PSTN 21 or connected to a Public Access Branch Exchange or PABX (not shown).

Still referring to FIG. 1, a mobile terminal 26 is shown for radio communications with both base station 20 and radio network cell station 10 via an antenna 28 using basically the same air-interface and the same spectrum. Terminal 26 includes a radio telephone such as a cellular phone. Terminal 26 may also include, for example, a full computer keyboard and display, a scanner, and have full graphics and multimedia capabilities. As illustrated in FIG. 1, when terminal 26 is in the range 24 of the base station 20, terminal 26 attaches to base station 20 and a radio link 30 may be established.

It will be understood by those having skill in the art that a complete private radio communications system, referenced herein for convenience by the numeral 24, will typically include a private base station 20 and a plurality of terminals 26. It will also be understood by those having skill in the art that conventional communications and handoff protocols may be used with the present invention, and need not be described further herein.

Today's wide area cellular networks, such as network 18 in FIG. 2, utilize cell reuse methodologies in order to reduce co-channel interference. Cell reuse guarantees that a channel used in one cell, such as cell (range) 12, is not reused in a cell nearby but only in cells at a sufficient distance away to avoid interference problems. In particular, the interfering signals experience a propagation loss sufficiently large such that with respect to the received (carrier) level of the desired signal, the resulting carrier-to-interference ratio in the considered cell is high enough for acceptable radio operation. Cell reuse provides the capability to cover large areas with only a limited amount of frequency spectrum.

An example of a cellular reuse pattern is illustrated with reference to FIG. 2, which depicts a 3-site/9-sector reuse plan within the network 18. This means that in a cluster L of nine sectors (indicated by the thick line) containing sectors A1, A2, A3, and B1, B2, B3, and C1, C2, C3, all frequencies are unique. Conventionally, the frequencies start to be reused in a structured manner outside the cluster L. The frequency planning is fixed in most cellular systems, but can be somewhat adaptive in more advanced cellular systems. In the latter case, the system can slowly adapt to changes in the network and can therefore be considered semi-fixed.

As discussed, private or personal communications systems 24, such as those serviced by base station 20, have been described and developed that make use of the same frequency spectrum as the cellular system. In this way, a cellular terminal 26 can access a private base station 20 without the need for modifications in the radio hardware design. These private base stations 20 provide a direct connection between the cellular terminal 26 and the PSTN 21 without the interaction of an overlaying cellular system or a cellular operator, such as at the radio network station 10. However, this also means that these private base stations 20 are not controlled by the cellular operator and thus are not integrated into the cellular system 18.

It should be understood, therefore, that since there is no coordination between the overlaying cellular system 18 and the private base stations 20 therein, the private systems 24 cannot be part of the reuse scheme employed in the cellular system. Consequently, problems of co-channel interference result since the private base stations 20 can use the same frequencies as the cellular system even though not being a part of the cellular reuse plan. In addition, private base stations 20, even though being in close proximity to each other, have no direct communication with each other, which is also a cause for co-channel interference between different and adjacent private radio systems 24.

As discussed in the aforementioned U.S. Pat. Nos. 5,428,668 and 5,526,402 and in U.S. patent application Ser. No. 08/517,710, a private radio system overlaid by a cellular system should not use those frequencies used by the cellular system in the cell (or in adjacent cells) where the private radio system is located. However, unlike a conventional reuse pattern described in connection with FIG. 2 where all frequencies within the cluster L are unique, frequencies used in distant cells within the cluster L may be reused, provided the frequencies used in the distant cells within the cluster L and in the neighboring cells of contiguous clusters are unique.

For example, if a private radio system 24, i.e., base station 20 and terminal 26 in FIG. 1, is located in cell A1, i.e., cell (range) 12, in a cellular system 18 with a 3/9 reuse scheme, as illustrated in FIG. 2, the private radio system 24 should not use those frequencies in serving cell A1 or in the contiguous surrounding cells A2, A3 or B2 (in a contiguous cluster), B3 or C2, C3. Rather, those frequencies in the more distant, non-contiguous cells B1 and C1 would be used, since those frequencies would produce the least amount of co-channel interference to the private radio system 24 and vice versa. Accordingly, private radio systems 24 located in cell Al would preferably choose radio frequencies for reuse from a set of frequencies formed from the set of frequencies used in the more distant and non-contiguous cells B1 and C1. Although the experienced interference from cells B1 and C1 is higher than interference from corresponding Al cells outside the cluster (which are the normal co-channel cells for cell A1), because of the small distance between the mobile terminal 26 and the private base station 20 and thus higher received carrier power, still an acceptable carrier-to-interference ratio can be obtained in the private radio system 24. Methods to derive this optimal set of frequencies to be used in the private system 24 are set forth in U.S. patent application Ser. No. 08/517,710 and in said related co-pending application of the present inventor, filed concurrently herewith.

The allocation of frequencies that permit a cellular system and a private radio system therein to co-exist and share the same communicating spectrum is one problem to consider, as addressed in said related co-pending application. The allocation of allowable transmit power levels to the private radio system, however, is another, which is addressed herein.

In accordance with the present invention, a method and a communications system are described by which a private radio system 24 autonomously determines a fixed transmit power level to use in a fixed power embodiment. In other words, the TX power level selected in accordance with the method and associated system of the present invention must be high enough so as to overcome interference from the overlaying cellular network 18, but small enough so as to not interfere with the cellular network 18. Consequently, an upper and a lower transmission level are determined, and the preferred TX value is within this range. Since a primary concern is to not cause interference to the cellular network 18, something unknown to private radio system 24 owners, the selected TX power level should be set at the low end of the range. This value represents the minimum required level to obtain acceptable Carrier-to-Interference (C/I) under average conditions, and the maximum transmit power level for use in the private radio system 24 when power control is applied. In the latter case, it is, of course, understood that if conditions allow lower TX power levels, i.e., the C/I are met, then the current regulated TX power value can be lower than the selected TX power level.

The first step of the method of the present invention is for the private radio system 24 in question to receive broadcast control information sent by the surrounding cellular base stations 10, i.e., those cell stations 10 in the serving cell and the surrounding and neighboring cells. Among other things, this downlink information includes a list of frequencies that the mobile station, such as terminal 26, is assumed to monitor in idle and connection modes. This list, referred to as a Broadcast Control Channel (BCCH) allocation list or BA list, contains the Absolute Radio Frequency Channel Numbers (ARFCN) of the control channels used in the neighboring cells, and is normally used for producing measurement reports to decide on cell re-selection and inter-cell handovers. By not only reading the broadcast information of the serving cell, such as cell A1, but also the broadcast information of the surrounding or contiguous or adjacent cells (whose carrier frequencies have been provided by the broadcast channel of the serving cell), a good indication can be obtained which broadcast control channel frequencies are used in the cells surrounding the private radio system, i.e., cells A2, A3, B2, B3, C2 and C3 surrounding A1.

For example, in FIG. 2, the serving cell A1, using the frequency ARFCN f_A1 for broadcasting information, will transmit a cell list, which includes the control channel frequencies (going counter-clockwise around cell A1) f_A2, f_B3, f_C2, f_C3, f_B2 and f_A3, respectively, used by the surrounding cells. However, when listening to broadcast information on, for example f_C2, another cell list having frequencies (going counter-clockwise around cell C2) f_B3, f_B1, f_A3, f_C1, f_C3 and f_A1, respectively, will be received. Similarly, when listening to the broadcast channels f_A2, f_B3, etc., more control channel frequencies will be identified (although for this specific 3/9 case, the two above broadcast messages revealed all control frequencies). In this way, the private radio system 24 can obtain a complete list of all control channel frequencies that are used in the cellular area neighboring the private radio system, e.g., a control channel list 40 as shown in FIGS. 3 and 4.

The aforedescribed broadcast listening can either be performed within the private radio system 24 itself, or the private radio system 24 or the base station 20 can order the radio personal communications terminal 26, such as a mobile station, to gather the downlink broadcast information of the neighboring control channels and subsequently transfer this information to the private base station 20 for further processing, as will be discussed herein.

After all control channel frequencies have been so identified, downlink measurements are then carried out (in the private base station 20 or the mobile station 26) to obtain received signal strength indications (RSSI) on each of the afore-identified control channels. After averaging these measurements, the private radio system 24 can then order the measured control channel frequencies according to their averaged RSSI, i.e., RXLEV, values from largest to smallest, forming an ordered list 42. If the (adaptive) frequency allocation scheme (as set forth in said related co-pending application) operates correctly, then the private radio system 24 will probably not select those traffic channels corresponding to the N strongest control channels, where N depends on the cellular pattern and other considerations (reuse factor, sectorization). For example, in FIG. 2, N is 7, indicating the serving cell (A1) and the adjacent six cells surrounding the serving cell in the first ring (i.e., A2, B3, C2, C3, B2 and A3). The control channel values for these stronger signals are preferably removed from the ordered list 42, forming a shorter candidate list 44.

Even after removing the N strongest control channels from the top of the list 42 to form candidate list 44, however, those control channels and their corresponding traffic channels that remain may nonetheless interfere with the private radio system 24. In order to overcome and minimize the effect of this interference, it is therefore necessary to set the TX power level in the private radio system to such a level that a certain Carrier-to-Interference (C/I) ratio is guaranteed over the range the system is supposed to operate, such as range 24.

With further reference to FIGS. 3 and 4, where a situation as in FIG. 2 is assumed, an example of the RSSI levels or RXLEV in the situation where the inter-Base Transceiver Station (BTS), i.e., network cell stations 10, distance is about 5 km is shown in FIG. 3. It should be understood that the RXLEV values depend on the BTS 10 TX power level, the distance between the BTS 10 and the measuring device, the orientation of the BTS antenna 14, shadowing and other factors. The RXLEV values on the control frequencies belonging to cells B1 and C1 (not adjacent cell A1) will be lowest due to the increased distance from the private radio system 24 in the serving cell A1 and the antenna orientation, as is shown in FIGS. 3 and 4. If the inter-BTS 10 distance is increased from about 5 km to about 25 km, the control channel list 40 may, for example, look like the one in FIG. 4.

Comparing the relative differences between the RXLEV of different control frequencies within either of the respective control channel lists 40 in FIGS. 3 and 4 does not show that much difference, but the absolute levels have nonetheless decreased by more than 20 dB when the inter-BTS 10 distance is increased, as can be seen from a comparison between the two lists. If the private radio system 24 measures a list 40 like that depicted in FIG. 3, then it will probably use frequency channels belonging to f_E1 and f_C1, as shown in the candidate list 44. Therefore, one can expect interference levels as high as −110 dBm. Depending on the desired range, the private base station 24 can then determine the minimum required TX power level which provides acceptable C/I. For example, if a private base station range of about 100 m is desired, having a nominal propagation loss of say 120 dB, the required TX power in order to provide nominal C/I of 10 dB is Ptx=10+120−110= 20 dBm. In other words, the required TX power is the sum of the nominal C/I required, the nominal propagation loss of a desired private base station range and the received signal level (maximum interference level) for the frequency in question. If instead a list like in FIG. 4 was measured, the maximum interference level to expect is −138 dBm, and therefore, the required TX power can be lowered by 28 dBm to −8 dBm in order to fulfill the same requirements specified previously.

The aforedescribed measurement procedure is preferably repeated periodically in order to adapt to changes in the cellular network 18. For example, if more cellular base stations 10 are added, the RSSI values of the control channels in co-channel cells will increase, and so will the required TX power levels in the private base station 24. Conversely, if base stations 10 are removed, the requisite TX power levels will decrease. Thus, the transmit power level allocation scheme of the present invention is done once at installation and updated periodically, albeit with a large time constant, such as on the order of days or even weeks.

As noted, since there is no coordination between the private radio system 24 and the overlaying cellular system or network 18, the private radio system 24 is not part of the reuse scheme of the cellular system. Consequently, the value of N, i.e., the number of strongest control channels to be removed from the list 42, N being a parameter dependent upon the reuse factor in the cellular system, is not generally available to the private radio system 24, particularly in view of the fact that reuse is only an ideal representation. However, the value for N may nonetheless be ascertained by examining the BCCH allocation list, i.e., the BA list, transmitted by each cellular base station 10. Upon reading the BA lists of the serving cell and the surrounding cells, an indication of the reuse is obtained by counting the number of unique ARFCNs when all of the BA lists are put together. For example, if a perfect reuse scheme is used and only the BA lists of the serving cell and the six strongest surrounding cells are taken into account, then for a 3/9 reuse, there are 9 unique ARFCNs. For a 4/12 reuse, there are 12 unique ARFCNs, and for a 7/21 reuse, there are 19 unique ARFCNs. Accordingly, the number of unique ARFCNs gives an indication of the reuse factor, albeit not a perfect indication.

The problem in selecting a suitable value for N is shown in the case where M unique ARFCNs are found in the BA list. The difference M−N is the number of cells the channel allocation scheme is supposed to steal, and N is the number of strongest frequencies that are hopefully not used for channel allocation, i.e., are removed from the list 42. If N is too small and the estimate is pessimistic, then the private system 24 will have too much TX power. Conversely, if N is too large, then the assumption is that the number of cells in the channel allocation scheme is small. Problems may therefore arise when the density of private systems 24 in the cell(s) increases and use is made of channels from cells whose BCCH were excluded in the power allocation routine. In any event, an algorithm has been found in which N is a parameter which can be derived from M by the following relationship:

$$N = \text{MAX}(M - 4, 7) \quad \text{if MAX}(M - 4, 7) < M$$
$$N = 1 \quad \text{otherwise}$$

Thus, if the reuse factor is small (smaller than 11 but bigger than 7), M is small and only the 7 strongest cellular bases (the serving cell and the six surrounding cells) are excluded. If the reuse factor is large, however, M is large, and more cellular base stations 10 are excluded, in which case the channel allocation scheme can still steal from 4 cells. The second condition, i.e., N=1, must be used in systems with very high reuse (a reuse factor smaller than or equal to 7), in which case only the serving cell is excluded.

The previous description is of a preferred embodiment for implementing the invention, and the scope of the invention should not necessarily be limited by this description. The scope of the present invention is instead defined by the following claims.

What is claimed is:

1. A method for allocating a transmit power level for a communications channel for a private radio system within a serving cell of a cellular system, where said private radio system and said cellular system share frequencies, said method comprising the steps of:

receiving, within said private radio system, downlink information from said serving cell and a plurality of cells surrounding said serving cell, said downlink information including a plurality of control channel frequencies for said serving and surrounding cells, forming a control channel list;

measuring, within said private radio system, the signal strengths of said plurality of control channel frequencies within said control channel list;

ordering said control channel frequencies within said control channel list according to the signal strength measurements, forming an ordered control channel list, said ordered list containing said control channel frequencies and the corresponding signal strength measurements thereof with the control channel frequency having the highest signal strength measurement at a top position within said ordered list and the control channel frequency having the lowest signal strength measurement at a bottom position within said ordered list;

selecting said communications channel from said bottom position of said ordered control channel list; and determining said transmit power level for said communications channel from the corresponding signal strength measurement.

2. The method according to claim 1, wherein said step of ordering said control channel frequencies further comprises:

removing a plurality of said control channel frequencies and corresponding signal strength measurements from said top position of said ordered control channel list prior to said step of selecting.

3. The method according to claim 2, wherein in said step of removing, each of said plurality of removed frequencies in said ordered list corresponds with a frequency from the serving cell and frequencies from cells contiguous thereto.

4. The method according to claim 2, wherein the number of said plurality of control channel frequencies and corresponding signal strength measurements removed from the top position of said ordered control channel list is N, where N represents the number of unique control channel frequencies among said serving cell and said surrounding cells contiguous thereto.

5. The method according to claim 1, wherein said step of determining said transmit power level comprises:

determining said transmit power level for said communications channel from the corresponding signal strength measurement and a desired signal range around said private radio system.

6. The method according to claim 1, wherein said steps therein are repeated periodically.

7. The method according to claim 6, wherein said steps are repeated a given number of days apart.

8. The method according to claim 6, wherein said steps are repeated a given number of weeks apart.

9. The method according to claim 1, wherein said steps are repeated and said transmit power level modified after changes to said cellular system.

10. The method according to claim 1, wherein said step of receiving said downlink information comprises:

receiving, within a mobile station in communication with said private station, said downlink information, and forming said control channel list;

wherein said step of measuring comprises: measuring, within said mobile station, said signal strengths; and wherein said mobile station forwards said downlink information, control channel list and said signal strength measurements to said private radio system.

11. The method according to claim 10, wherein said step of ordering said control channel frequencies occurs within said mobile station, said ordered control channel list being forwarded to said private radio system.

12. The method according to claim 11, wherein said step of selecting said communications channel from said bottom position of said ordered control channel list occurs within said mobile station after said step of ordering and before said step of forwarding, said selected communications channel being forwarded by said mobile station to said private radio system.

13. The method according to claim 1, wherein in said step of receiving said plurality of control channel frequencies, M represents the number of unique control channel frequencies within a reuse grouping for said cellular system, said private radio system being within a cell within said reuse grouping, said serving cell and said surrounding cells contiguous thereto being within said reuse grouping, and N represents the number of unique control channel frequencies among said serving cell and said contiguous surrounding cells, the value for N being determined by the following relationship:

if MAX(M−4,7)<M, then N=MAX(M−4,7), else N=1.

14. The method according to claim 13, wherein said reuse grouping is a 3/9 reuse, M equals 9 and N equals 7.

15. The method according to claim 13, wherein said reuse grouping is a 4/12 reuse, M equals 12 and N equals 8.

16. In a cellular communications system having a multiplicity of cells, each with a cellular base station therein, and a private radio system within one of said cells, circuitry within the private radio system for determining a transmit power level for a communications channel for said private radio system within said cellular communications system, where said private radio system and said cellular system share frequencies, said circuitry comprising:

a receiver for receiving control channel frequencies and signal strength measurements from the cellular base stations of said one cell and a plurality of cells surrounding said one cell;

memory means for storing a control channel list of said frequencies and corresponding signal measurements;

ordering means for ordering the frequencies within the control channel list pursuant to the corresponding signal strength measurements, forming an ordered control channel list with the control channel frequency having the highest signal strength measurement at a top position within said ordered list and the control channel frequency having the lowest signal strength measurement at a bottom position within said ordered list;

selecting means for selecting said communications channel from said bottom position of said ordered control channel list; and determining means for determining the transmit power level for said communications channel from the corresponding signal strength measurement.

17. The circuitry according to claim 16, wherein said receiver is within a mobile station in communication with said private station.

18. The circuitry according to claim 17, wherein said memory means, ordering means and selecting means are within said mobile station, said communication channel selection being forwarded by said mobile station to said determining means within said private radio system.

19. The circuitry according to claim 16, wherein said receiver receives M control channel frequencies, M representing the number of unique control channel frequencies within a reuse grouping for said cellular communications system, said private radio system being within a serving cell within said reuse grouping, the surrounding cells contiguous said serving cell being within said reuse grouping, and N represents the number of unique control channel frequencies among said serving cell and said contiguous surrounding cells, the value for N being determined by the following relationship:

if MAX(M−4,7)<M, then N=MAX(M−4,7), else N=1.

20. The system according to 19, wherein said reuse grouping is a 3/9 reuse, M equals 9 and N equals 7.

21. The system according to 19, wherein said reuse grouping is a 4/12 reuse, M equals 12 and N equals 8.

* * * * *